(12) United States Patent
Wilkinson et al.

(10) Patent No.: US 8,878,649 B2
(45) Date of Patent: Nov. 4, 2014

(54) METHOD AND APPARATUS PERTAINING TO USE OF A PLURALITY OF DIFFERENT RFID TAG INTERROGATION MODES

(75) Inventors: Bruce W. Wilkinson, Rogers, AR (US); Nicholaus A. Jones, Fayetteville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 755 days.

(21) Appl. No.: 12/900,201

(22) Filed: Oct. 7, 2010

(65) Prior Publication Data

US 2012/0086554 A1    Apr. 12, 2012

(51) Int. Cl.
    *G06K 7/00*    (2006.01)
    *G06K 7/10*    (2006.01)
(52) U.S. Cl.
    CPC .................................. *G06K 7/10138* (2013.01)
    USPC ...................... 340/10.1; 340/10.5; 340/572.4
(58) Field of Classification Search
    CPC ................................................. G06K 7/10138
    USPC ........................ 340/10.1, 10.5, 572.1, 572.4
    See application file for complete search history.

(56) References Cited

U.S. PATENT DOCUMENTS

| | | | |
|---|---|---|---|
| 6,677,852 B1 * | 1/2004 | Landt | 340/10.1 |
| 7,075,412 B1 * | 7/2006 | Reynolds et al. | 340/10.2 |
| 7,187,288 B2 | 3/2007 | Mendolia et al. | |
| 7,205,896 B2 | 4/2007 | Wu et al. | |
| 7,528,726 B2 | 5/2009 | Lee et al. | |
| 2006/0261955 A1 * | 11/2006 | Humes et al. | 340/572.2 |
| 2007/0206701 A1 * | 9/2007 | Paley et al. | 375/295 |
| 2008/0100439 A1 * | 5/2008 | Rinkes | 340/572.1 |
| 2008/0180221 A1 * | 7/2008 | Tuttle | 340/10.2 |
| 2009/0266895 A1 | 10/2009 | Shibata et al. | |
| 2009/0273448 A1 | 11/2009 | Tuttle | |
| 2010/0079245 A1 | 4/2010 | Perng et al. | |
| 2010/0127828 A1 | 5/2010 | Connolly et al. | |
| 2010/0141395 A1 | 6/2010 | Nagai | |

FOREIGN PATENT DOCUMENTS

KR    10-2008-0112444    12/2008

OTHER PUBLICATIONS

EPC Radio-Frequency Identity Protocols Class-1 Generation-2 UHF RFID Protocol for Communications at 860 MHz- 960 MHz Version 1.0.8, Dec. 2004, pp. 1-93.*
PCT; App. No. PCT/US2011/054927; International Preliminary Report on Patentability mailed Apr. 18, 2013.
PCT; App. No. PCT/US2011/054927; International Search Report mailed Apr. 10, 2012.

(Continued)

*Primary Examiner* — Edwin Holloway, III
(74) *Attorney, Agent, or Firm* — Fitch, Even, Tabin & Flannery, LLP

(57) ABSTRACT

A control circuit that operably couples to an RFID tag reader can cause the latter to automatically utilize more than a single RFID tag interrogation mode. By one approach this can comprise automatically toggling back and forth between at least two different RFID tag interrogation modes. If desired, and by one approach, such a control circuit can facilitate using a first interrogation mode to read RFID tags and then, in response to a first pre-determined condition, automatically switch to using a second interrogation mode that is different from the first interrogation mode. By one approach, this first pre-determined condition can comprise an RFID tag read rate value. By another approach, alone or in combination with the foregoing, this first pre-determined condition can comprise, at least in part, a pre-determined period of time.

18 Claims, 2 Drawing Sheets

(56) References Cited

OTHER PUBLICATIONS

PCT; App. No. PCT/US2011/054927; Written Opinion mailed Apr. 10, 2012.

"EPC™ Radio-Frequency Identity Protocols Class-1 Generation-2 UHF RFID Protocol for Communications at 860 MHz-960 MHz Version 1.0.9;" Specification for RFID Air Interface by EPCglobal Inc.; 94 pages, Jan. 2005.

* cited by examiner

METHOD AND APPARATUS PERTAINING TO USE OF A PLURALITY OF DIFFERENT RFID TAG INTERROGATION MODES

TECHNICAL FIELD

This invention relates generally to the reading of Radio Frequency IDentification (RFID) tags.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

There are proposals to utilize RFID tags to individually identify individual items. The Electronic Product Code (EPC) as managed by EPCGlobal, Inc. represents one such effort in these regards. EPC-based RFID tags each have a unique serial number to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 is hereby fully incorporated herein by this reference.)

Being able to read and then uniquely identify each item within a manufacturing facility, a cargo container, a staging area, or in a retail display area offers any number of useful opportunities. Unfortunately, the very nature of RFID-based technology, coupled with a correspondingly potentially enormous number of individually-tagged items also gives rise to a number of challenges as well. As one example in these regards, reading RFID tags is often not a particularly speedy transaction. As a result it can take a significant amount of time to read a large number of RFID tags in some application settings.

At the same time, many applications settings can contain a large number of RFID tags to be read (such as thousands, tens of thousands, or even hundreds of thousands of tags). In addition, and exacerbating the relevant challenges, is that many such application settings presently frequently (and unpredictably) dynamic circumstances. For example, previously-read RFID tags can be moved within the application setting or can leave the application setting. Similarly, new un-read RFID tags can enter the application setting (in small or large quantities).

If, for example, 10,000 RFID tags all simultaneously receive a query command they will all at least attempt to participate in that inventory cycle. As a result, this inventory cycle could take several seconds to complete. If another RFID tag enters this inventory zone during this time, that new RFID tag will typically have to wait for a next query command. That new RFID tag, however may be in this particular area less than the several seconds it might have to wait before the reader is ready to start that next inventory cycle. In such a case the reader will be unaware of the transitory presence of that new RFID tag. The number of tags that could potentially be missed is large enough in some application settings to render this solution impractical.

Furthermore, in a large area such as the sales floor of a large retail store many RFID tags may only have power for brief moments of time as they move from time to time within that area. In that case many such RFID tags may well miss the beginning of many such inventory cycles and consequently never be seen as they move out of the area being inventoried before a new such cycle begins.

In an attempt to redress such circumstances to at least some extent, the aforementioned Electronic Product Code (EPC) as managed by EPCGlobal provides for a number of different RFID tag interrogation modes. The best mode for such circumstances might be the worst mode for other circumstances. This, in turn, permits a given enterprise to select, for on-going uninterrupted use, a particular interrogation mode that best suits the relative volume and dynamic circumstances as tend to characterize their application setting. While such an approach has been helpful, however, there nevertheless remain unmet needs in these regards.

BRIEF DESCRIPTION OF THE DRAWINGS

The above needs are at least partially met through provision of the method and apparatus pertaining to use of a plurality of different RFID tag interrogation modes described in the following detailed description, particularly when studied in conjunction with the drawings, wherein.

Figure 1:
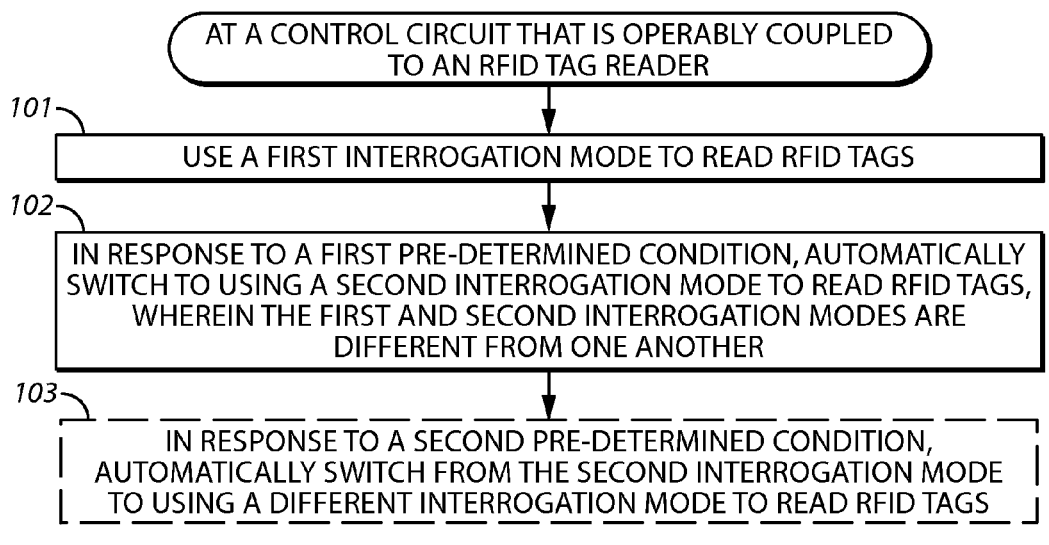
FIG. 1 comprises a flow diagram as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a control circuit that operably couples to a Radio-Frequency IDentification (RFID) tag reader can cause the latter to automatically utilize more than a single RFID tag interrogation mode. By one approach this can comprise automatically toggling back and forth between at least two different RFID tag interrogation modes.

If desired, and by one approach, such a control circuit can facilitate using a first interrogation mode to read RFID tags and then, in response to a first pre-determined condition, automatically switch to using a second interrogation mode that is different from the first interrogation mode. By one approach, this first pre-determined condition can comprise an RFID tag read rate value. By another approach, alone or in combination with the foregoing, this first pre-determined condition can comprise, at least in part, a pre-determined period of time.

By one approach, the second interrogation mode can comprise reading only particularly-selected RFID tags. This selection state can be established, by one approach, using the aforementioned control circuit. By another approach, if desired, another system component (such as another such control circuit) can establish this selection state. In either case, if desired, establishing such a selection state can comprise, by one approach, using an RFID tag select flag to select a particular subset of RFID tags from amongst a large candidate population.

These teachings are highly flexible in practice and can be practiced using any of a variety of known interrogation modes. These teachings will also no doubt readily similarly accommodate any number of as-yet-to-be-developed interrogation modes. These teachings are also highly scalable in practice and will accommodate any number of available interrogation modes, RFID tag readers, and essentially any number of RFID tags to be read or monitored.

By one approach, these teachings will facilitate using a first interrogation mode to initially read a potentially large population of RFID tags (and to quiet the resultant read RFID tags until those tags are later specifically selected to be read or remain unpowered for at least some given period of time) as well as a second interrogation mode that provides for reading only specifically-selected RFID tags. By toggling (for example, as a function of time) between such interrogation modes, for example, these teachings will support both bulk reading requirements as may arise when a large number of new RFID tags are introduced into a monitored area such as a sales floor as well as more targeted reading tasks to support desired additional functionality in these regards.

These and other benefits may become clearer upon making a thorough review and study of the following detailed description. Referring now to the drawings, and in particular to FIG. 1, an illustrative process 100 that is compatible with many of these teachings will now be presented. As will be discussed further below, this process 100 can be carried out by a control circuit that is operably coupled to one or more RFID-tag readers.

At step 101 this process 100 uses a first interrogation mode to read RFID tags. This first interrogation mode can comprise essentially any interrogation mode as may presently exist or which may be developed in the future. As a more specific illustrative example in these regards (but without intending any limitations in these regards), this first interrogation mode can comprise any of the four sessions supported by the Electronic Product Code (EPC) Gen2 standard.

At this point it may be useful to note that each EPC GEN 2 compliant tag has two states: "A" and "B." The "A" state comprises the default state and hence represents the tag's state when initially powering up. Once a tag has been read its state changes from "A" to "B." During the "A" state a tag will respond to any reader that offers a session query. During the "B" state the tag will not again respond to a reader using the same session query. EPC Gen2's four different sessions provide for differences with respect to how a read tag persists a "B" state. In Session "0" a read tag will persist this "B" state until power is lost and then the tag reverts immediately to the "A" state. In Session "1" a read tag will persist its "B" state for a period of time ranging from 500 ms to 5 seconds and will then automatically revert to the "A" state. In Session "2" and "3" a read tag will remain in the "B" state until power is lost. Then, once power is lost, the read tag will persist its "B" state for at least an additional 2 seconds (the actual persistence duration is left to the manufacturer and can reach minutes in some cases).

Generally speaking, for many application settings it may be useful for this first interrogation mode to comprise an EPC Gen2 standard-compatible session 2 or session 3 interrogation mode. In this case, "A" state tags are read and then remain quiet and will not respond to further same-session queries unless and until power has been absent for at least 2 seconds and possibly longer (depending upon the characterizing performance of the tags themselves).

Figure 2:
FIG. 2 comprises a block diagram as configured in accordance with various embodiments of the invention.

So configured, this first interrogation mode is well suited to read a large number of un-read tags. As illustrated in FIG. 2, a given RFID tag reader 200 may serve in these regards to read a group 201 of tags. In this example, this might comprise any number of tags (for example, hundreds, thousands, or even tens or hundreds of thousands of tags) that are presently "A" state tags. (In FIG. 2, one of the tags 202 hosts an asterisk; this symbol serves an explanatory purpose described further below.)

Pursuant to step 101 described above, this RFID tag reader 200 employs the first interrogation mode 300 to read this group 201 of tags. A read tag, such as the tag denoted by reference numeral 301, becomes a "B"-state tag. A tag being read, such as the tag denoted by reference numeral 202, is in the process of switching from its "A" state to its "B" state. And, of course, tags not yet read, such as the tag denoted by reference numeral 302, are still in their "A" state.

Figure 3:
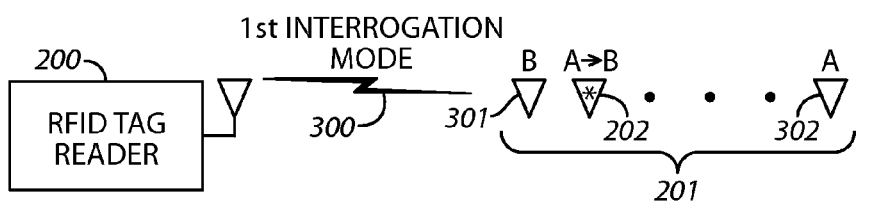
FIG. 3 comprises a block diagram as configured in accordance with various embodiments of the invention.
Figure 4:
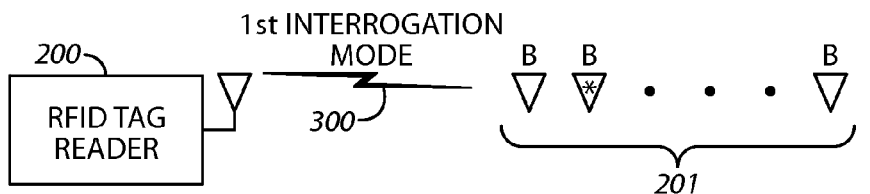
FIG. 4 comprises a block diagram as configured in accordance with various embodiments of the invention.

By one approach, and as shown in FIG. 3, at some point in time all of the tags (or, at least all of the tags capable of being read at this time) in this group 201 of tags have been read and are now in the "B" state. This being so, these "B"-state tags will remain quiet as the RFID tag reader 200 utilizes the same first interrogation mode 300. Accordingly, if and as any new "A" state tags should enter the RFID tag reader's coverage area that new tag can be easily and quickly read as this new tag is not competing with these previously read tags for an opportunity to respond to the RFID tag reader's query.

Referring again to FIG. 1, at step 102 this process 100 responds to a first pre-determined condition by automatically switching to using a second interrogation mode to read RFID tags that is different from the first interrogation mode. By one approach, this first pre-determined condition can comprise an RFID tag read rate value. For example, the interrogation mode switch facilitated by this step 102 can occur when the RFID tag read rate (that is, the number of "A"-state tags that respond to the RFID tag reader over time) as measured when using the first interrogation mode is less than a threshold RFID tag read rate value.

In such a case, when the threshold RFID tag read rate value is zero, then this switch will occur when there are no further "A"-state tags left to read. As another example, when the threshold RFID tag read rate value is X (where "X" is some non-zero value), then this switch will occur when the RFID tag read rate drops below X. By one approach, this threshold-based requirement can be further conditioned upon the threshold level being maintained for at least some minimum duration of time such as one second, five seconds, ten seconds, and so forth. Such a rate-based approach may be particularly useful when, for example, it is known a priori that a very large number of new tags require reading (as when a number of new pallets of tagged merchandise are first brought forth onto a monitored sales floor).

By another approach, alone or as used in conjunction with the foregoing, this first pre-determined condition can comprise, at least in part, a pre-determined period of time. So configured, this step 102 will facilitate switching from using the first interrogation mode to the second interrogation mode when a given amount of time has passed. The particular amount of time can vary to suit the needs or opportunities as tend to characterize a given application setting. For example, this given amount of time might comprise one second, five seconds, ten seconds, one minute, and so forth as desired.

The second interrogation mode can differ from the first interrogation mode as desired. By one approach this second interrogation mode can comprise reading only a particularly-selected subset of RFID tags. (As used herein, this reference to a "particularly-selected subset of RFID tags" is not to be read as including "A"-state tags that merely haven't been read or that are otherwise available and waiting to respond to any session query in order to achieve the "B" state but can include tags (in either an "A" state and/or a "B" state) that have been otherwise selected as per some other selection criterion.)

Without intending any particular limitations in these regards, the EPC Gen2 standard provides for using an RFID tag select flag to define and hence "select" such a particularly-selected subset of RFID tags. By using an EPC Gen2 standard-compatible RFID tag select flag, for example, one can select to read only tags that correspond to a particular Stock Keeping Unit (SKU). This might be a SKU that a system administrator wishes to presently inventory.

As another example, this might comprise a SKU that corresponds to one or more RFID tags that were read during the preceding use of the first interrogation mode. For example, in a case where only one RFID tag having this particular SKU was read while using the first interrogation mode, it may be useful to now specifically seek other RFID tags that share this same SKU in order to ascertain whether further such RFID tags are indeed present.

Figure 5:
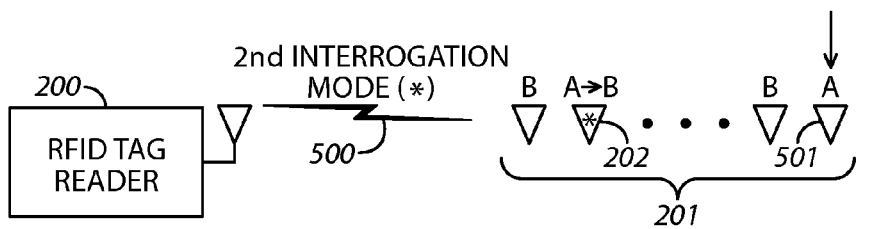
FIG. 5 comprises a block diagram as configured in accordance with various embodiments of the invention.

FIG. 5 provides an illustrative example in these regards. In this example, the second interrogation mode 500 is a session 2 (or session 3) query that presents a particular RFID tag select flag to indicate that only RFID tags matching a particular search criterion (denoted here by the aforementioned asterisk "*") are to respond. In this particular example, only the one RFID tag denoted by reference numeral 202 corresponds to this flag limitation and responds to the query. Following this response, of course, this RFID tag 202 maintains its prior "B"-state status. (Various selection approaches are known in the art. This includes, for example, but is not limited to the use of a selected flag "SL" parameter as per the EPC Gen2 standard. Accordingly, and as these teachings are not overly sensitive to any particular choice of implementation in these regards, further elaboration and description of selection approaches will not be provided here.)

Meanwhile, and still for the sake of example, a new RFID tag (denoted by reference numeral 501) has joined this group 201. Being previously non-interrogated within the relevant time frame, this new RFID tag 501 is in the "A" state. Because the second interrogation mode 500 is specifically limited to only RFID tags that match a particular selection criterion, however, this new RFID tag 501 (which does not match the selection criterion) will remain non-responsive and hence remain in this "A" state.

Again using the EPC Gen2 standard as an illustrative example, this second interrogation mode could differ from the first interrogation mode by being a different session type. These teachings will also accommodate, however, permitting use of a same session type (such as session 2 or session 3) for both the first and second interrogation mode and relying for a difference instead upon using an RFID tag select flag as described above for the second interrogation mode.

As noted earlier, these teachings are highly flexible and will accommodate a considerable number of variations as to the specifics of carrying out these steps. As one relevant example in these regards, by one approach both the first and the second interrogation mode can be implemented by a same RFID tag reader. By another approach, however, a first RFID tag reader can carry out the first interrogation mode while a second, different RFID tag reader carries out the second interrogation mode. It could also be that one antenna of a reader is utilized for one interrogation mode while the same reader utilizes another antenna for the other interrogation mode.

As a further example of the flexibility of these teachings, and referring again to FIG. 1, at optional step 103 this process 100 responds to a second pre-determined condition to automatically switch from the second interrogation mode to using a different interrogation mode to read RFID tags. As before, this pre-determined condition can comprise any of a number of relevant possibilities including but not limited to time-based considerations, tag-reading rate considerations, time-of-day, and so forth.

Figure 6:
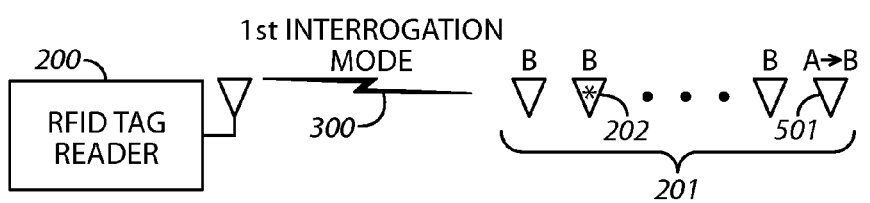
FIG. 6 comprises a block diagram as configured in accordance with various embodiments of the invention.

By one approach, this different interrogation mode can comprise the first interrogation mode described above. So configured, this process 100 can essentially then repeat itself over and over to thereby automatically toggle back and forth between these two (or more) RFID tag interrogation modes. To continue with the example begun above, and referring now to FIG. 6, upon switching again to the first interrogation mode 300 the previously-mentioned new RFID tag 501 will now respond to the query. These components will likely complete this transaction quickly in this example as the remaining RFID tags of this group 201 remain in their "B" states, leaving only the new RFID tag 501 to respond. Upon responding, of course, this new RFID tag 501 will itself switch from the "A" state to the "B" state.

By toggling back and forth between such interrogation modes, one can generally read a plurality of RFID tags and then quiet the read RFID tags until those RFID tags are later specifically selected to be read as described above or remain unpowered for at least the requisite period of time as corresponds to these particular tags. By one approach, for example, this might comprise using the first interrogation mode for a given amount of time, such as half a second, and then automatically switching to the second interrogation mode for a like amount of time before repeating these activities with the first interrogation mode again. The amount of time in each mode could vary depending on the most effective means of inventorying the tag population.

Figure 7:
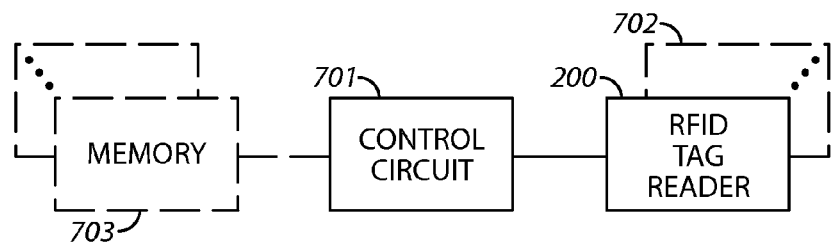
FIG. 7 comprises a block diagram as configured in accordance with various embodiments of the invention.

The above-described processes are readily enabled using any of a wide variety of available and/or readily configured platforms, including partially or wholly programmable platforms as are known in the art or dedicated purpose platforms as may be desired for some applications. Referring now to FIG. 7, an illustrative approach to such a platform 700 will now be provided.

This platform 700 can comprise a control circuit 701 of choice. Such a control circuit 701 can comprise a fixed-purpose hard-wired platform or can comprise a partially or wholly programmable platform. These architectural options are well known and understood in the art and require no further description here. This control circuit 701 couples to an RFID tag reader 200 of choice (and possibly connects to and controls a second or more such RFID tag reader 702 as desired). This control circuit 701 also optionally couples, if desired, to one or more digital memory components 703. By one approach this memory 703 can serve to store working data. To the extent the control circuit 701 comprises a partially or wholly-programmable platform, this memory 703 can also serve to store the instructions which, when executed by the control circuit 701, cause the control circuit 701 to carry out one or more of the steps, actions, or functionality as described herein.

So configured, for example, this control circuit 701 can cause the RFID tag reader 200 (or readers) to use a first interrogation mode to read RFID tags and to then automatically switch to a second (different) interrogation mode to read RFID tags in response to a first pre-determined condition as described herein. Such an approach can serve, for example, to cause the control circuit 701 to toggle between such interrogation modes in order to accommodate divergent purposes in an integrated manner.

Such an apparatus 700 may be comprised of a plurality of physically distinct elements as is suggested by the illustration shown in FIG. 7. It is also possible, however, to view this illustration as comprising a logical view, in which case one or more of these elements can be enabled and realized via a shared platform.

As noted, these teachings are readily employed to greatly leverage existing RFID tag reading equipment and existing RFID tag reading protocols and methodologies. These teachings are also highly scalable and can be effectively and economically employed with as few, or as many, RFID tag readers, tags (including tags having different "B"-state persistence characteristics), reading protocols, and so forth as one might wish.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
at a control circuit that is operably coupled to a radio frequency identification (RFID) tag reader:
using a first interrogation mode to read RFID tags, wherein the first interrogation mode comprises an interrogation mode selected from the group consisting of an Electronic Product Code (EPC) Gen2 standard-compatible session 0, 1, 2, and 3 approach and wherein the first interrogation mode prompts receiving RFID tags to respond using a first approach to responding;
in response to a first pre-determined condition, automatically switching to using a second interrogation mode to read RFID tags wherein the second interrogation mode comprises an interrogation mode selected from the group consisting of an Electronic Product Code (EPC) Gen2 standard-compatible session 0, 1, 2, and 3 approach, wherein the first and second interrogation modes are different from one another and wherein the second interrogation mode prompts receiving RFID tags to respond using a second approach to responding that is different from the first approach to responding, wherein the first pre-determined condition comprises, at least in part, an RFID tag read rate value, such that the automatic switching occurs when the RFID tag read rate as measured while using the first interrogation mode is less than the RFID tag read rate value.

2. The method of claim 1 wherein the first interrogation mode comprises an interrogation mode selected from the group consisting of an Electronic Product Code (EPC) Gen2 standard-compatible session 2 and an Electronic Product Code (EPC) Gen2 standard-compatible session 3 approach.

3. The method of claim 1 wherein the second interrogation mode comprises reading only a particularly-selected subset of RFID tags.

4. The method of claim 3 wherein the second interrogation mode comprises, at least in part:
using an RFID tag select flag to select the particularly-selected subset of RFID tags.

5. The method of claim 4 wherein using an RFID tag select flag comprises, at least in part, using an Electronic Product Code (EPC) Gen2 standard-compatible RFID tag select flag.

6. The method of claim 1 wherein the first pre-determined condition comprises, at least in part, a pre-determined period of time.

7. The method of claim 1 further comprising:
in response to a second pre-determined condition, automatically switching from the second interrogation mode to using a different interrogation mode to read RFID tags.

8. The method of claim 7 wherein the different interrogation mode comprises the first interrogation mode.

9. The method of claim 1 wherein:
using a first interrogation mode to read RFID tags comprises using the RFID tag reader to read RFID tags; and
automatically switching to using a second interrogation mode to read RFID tags comprises using the RFID tag reader to read the RFID tags.

10. The method of claim 1 wherein the control circuit is also operably coupled to a second radio frequency identification (RFID) tag reader and wherein:
using a first interrogation mode to read RFID tags comprises using the RFID tag reader to read RFID tags; and
automatically switching to using a second interrogation mode to read RFID tags comprises using the second RFID tag reader to read the RFID tags.

11. An apparatus comprising:
a control circuit that is operably coupled to a radio frequency identification (RFID) tag reader and that is configured to:
use a first interrogation mode to read RFID tags, wherein the first interrogation mode comprises an interrogation mode selected from the group consisting of an Electronic Product Code (EPC) Gen2 standard-compatible session 0, 1, 2, and 3 and wherein the first interrogation mode prompts receiving RFID tags to respond using a first approach to responding;
in response to a first pre-determined condition, automatically switch to using a second interrogation mode to read RFID tags wherein the second interrogation mode comprises an interrogation mode selected from the group consisting of an Electronic Product Code (EPC) Gen2 standard-compatible session 0, 1, 2, and 3 approach, wherein the first and second interrogation modes are different from one another and wherein the second interrogation mode prompts receiving RFID tags to respond using a second approach to responding that is different from the first approach to responding, wherein the first pre-determined condition comprises, at least in part, an RFID tag read rate value, such that the automatic switching occurs when the RFID tag read rate as measured while using the first interrogation mode is less than the RFID tag read rate value.

12. The apparatus of claim 11 wherein the first interrogation mode comprises an interrogation mode selected from the group consisting of an Electronic Product Code (EPC) Gen2 standard-compatible session 2 and an Electronic Product Code (EPC) Gen2 standard-compatible session 3 approach.

13. The apparatus of claim 11 wherein the second interrogation mode comprises reading only a particularly-selected subset of RFID tags.

14. The apparatus of claim 13 wherein the second interrogation mode comprises, at least in part:
    using an RFID tag select flag to select the particularly-selected subset of RFID tags.

15. The apparatus of claim 14 wherein the control circuit is configured to use an RFID tag select flag by, at least in part, using an Electronic Product Code (EPC) Gen2 standard-compatible RFID tag select flag.

16. The apparatus of claim 11 wherein the first pre-determined condition comprises, at least in part, a pre-determined period of time.

17. The apparatus of claim 11 wherein the control circuit is further configured to:
    in response to a second pre-determined condition, automatically switch from the second interrogation mode to using a different interrogation mode to read RFID tags.

18. The apparatus of claim 17 wherein the different interrogation mode comprises the first interrogation mode.

* * * * *